United States Patent [19]

Heilweil

[11] Patent Number: 4,792,412
[45] Date of Patent: Dec. 20, 1988

[54] HIGH TEMPERATURE STABLE AQUEOUS BRINE FLUIDS VISCOSIFIED BY POLYVINYLPYRROLIDONE

[75] Inventor: Israel J. Heilweil, Princeton, N.J.

[73] Assignee: Mobil Oil Corporation, New York, N.Y.

[21] Appl. No.: 107,912

[22] Filed: Oct. 15, 1987

Related U.S. Application Data

[63] Continuation of Ser. No. 413,571, Aug. 31, 1982, abandoned.

[51] Int. Cl.$^4$ ................................................ C09K 7/02
[52] U.S. Cl. ................................. 252/8.514; 252/8.51; 252/8.551; 252/363.5; 524/436; 524/548
[58] Field of Search ................. 252/8.51, 8.514, 8.551, 252/363.5; 524/548, 401, 436

[56] References Cited

U.S. PATENT DOCUMENTS

| 2,648,647 | 8/1953 | Stanton et al. | 524/783 |
| 3,025,234 | 3/1962 | Canterino | 252/8.5 |
| 3,629,101 | 12/1971 | Hille et al. | 252/8.5 |
| 4,045,357 | 8/1977 | Reed | 252/8.5 |
| 4,046,197 | 9/1977 | Gruesbeck et al. | 252/8.5 X |
| 4,079,011 | 3/1978 | Tate | 252/8.55 |
| 4,304,677 | 12/1981 | Stauffer et al. | 252/8.55 |
| 4,330,414 | 5/1982 | Hoover | 252/8.5 |

OTHER PUBLICATIONS

Morawetz, *Macromolecules in Solution*, pub. 1965 by Interscience Publishers, New York.

Primary Examiner—Herbert B. Guynn
Attorney, Agent, or Firm—Alexander J. McKillop; Michael G. Gilman; Charles J. Speciale

[57] ABSTRACT

There is provided an aqueous brine fluid containing a high salt concentration and a polyvinylpyrrolidone polymer or copolymer which serves to increase the viscosity thereof, particularly at elevated temperatures of above about 300° F. These fluids are particularly useful as drilling fluids for the drilling of oil and gas wells.

15 Claims, No Drawings

HIGH TEMPERATURE STABLE AQUEOUS BRINE FLUIDS VISCOSIFIED BY POLYVINYLPYRROLIDONE

This is a continuation of copending application Ser. No. 413,571, filed Aug. 31, 1982, and now abandoned.

CROSS REFERENCE TO RELATED APPLICATION

Copending Application Ser. No. 413,575 filed Aug. 31, 1982, now U.S. Pat. No. 4,498,994, in the name of Israel J. Heilweil relates, inter alia, to drilling fluids containing non-aqueous solvent such as an N-methyl-2-pyrrolidone. Thickeners including, e.g., polyvinylpyrrolidone may optionally be employed.

The entire disclosure of this above-mentioned U.S. patent application is expressly incorporated herein by reference.

BACKGROUND OF THE INVENTION

The present invention relates to brine fluids, particularly drilling fluids which have high salt concentration and which are viscosified with polyvinylpyrrolidone.

During the drilling of an oil well, a usually aqueous fluid is injected into the well through the drill pipe and recirculated to the surface in the annular area between the well-bore wall and the drill string. The functions of the drilling fluid include: lubrication of the drill bit, transportation of cuttings to the surface, overbalancing formation pressure to prevent an influx of oil, gas or water into the well, maintenance of hole stability until casings can be set, suspension of solids when the fluid is not being circulated, and minimizing fluid loss into and possible associated damage/instability to the formation through which drilling is taking place.

Proper overbalancing of formation pressure is obtained by establishing fluid density at the desired level usually via the addition of barite (greater than or equal to 95% barium sulfate). Transportation of cuttings and their suspension when the fluid is not circulating is related to the fluid viscosity and thixotropy which depend on solids content and/or use of a polymer. Filter loss control is obtained also by the use of clays and/or added polymers.

Fluid properties are constantly monitored during the drilling operations and tailored to accommodate the nature of the formation stratum being encountered at the time. When drilling reaches the producing formation special concern is exercised. Preferentially low solids content fluids are used to minimize possible productivity loss by solids plugging. Proper fluid density for overbalancing formation pressure may be obtained by using high salt concentration aqueous brines while viscosity and filter loss control may be obtained by polymer addition. Substantial future oil well drilling will be at depths between 15 and 30 thousand feet where temperatures encountered can be 350° F. Temperatures such as these, coupled with the desire for low solids content and preferably minimum added solids, require brine tolerant and high temperature stable polymers for viscosity and filtration control. Conventionally-employed polymers such as starch, carboxymethyl cellulose, and modified polyacrylates are not stable at such high temperatures and some have severe brine tolerance limitations.

Current high density, clear brine systems utilize hydroxyethyl cellulose polymers and related materials as viscosifiers, but these are normally unstable at about 150° C., and tend to crosslink and gel with time and temperature which may cause various drilling operational problems.

SUMMARY

According to one aspect of the invention, there is provided an aqueous brine fluid comprising:
(i) a viscosity increasing amount of one or more polyvinylpyrrolidone polymers, said polymers having at least 50 mole percent of vinylpyrrolidone repeating units; and
(ii) a solubilizing amount of a solubilizing salt sufficient to solubilize said polyvinylpyrrolidone polymers, said solubilizing salt constituting at least about 30% by weight or even at least about 50% by weight of said fluid.

According to another aspect of the invention, there is provided a brine fluid which is a drilling fluid having the above-mentioned components of polyvinylpyrrolidone (i) and salt (ii).

According to another aspect of the invention, there is provided a method for transporting cuttings away from a drill bit to the surface of a bore hole, said method comprising entraining and suspending said cuttings in a drilling fluid which flows from said drill bit up said bore hole to said surface, wherein said drilling fluid comprises:
(i) water;
(ii) at least 30% by weight of a density increasing salt in an amount sufficient to increase the density of said fluid in order to overbalance the formation pressure; and
(iii) a viscosity increasing amount of one or more polyvinylpyrrolidone polymers, said polymers having at least 50 mole percent of vinylpyrrolidone repeating units.

DETAILED DESCRIPTION

One or more polyvinylpyrrolidone polymers are added to aqueous high brine content solutions (e.g., 30–60% wt. salt) providing a liquid of substantially enhanced viscosity which is particularly suitable for use as an oil well drilling fluid. The use of such polymers results in improved resistance to viscosity loss at elevated temperatures (e.g., more than about 300° F.) compared to conventional viscosity building water/brine soluble polymers and thus is useful in the drilling of deep wells. They may also provide some filtration control properties, reducing fluid loss into, and possible damage to, the oil bearing formation.

A preferred polyvinylpyrrolidone polymer is a homopolymer of the formula

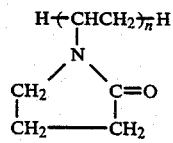

where n is at least about 90. Copolymers of N-vinyl-2-pyrrolidone with other unsaturated, addition polymerizable monomers are also possible, provided that the repeating polymeric units of the copolymers are predominately vinylpyrrolidone units. Such copolymers preferably have a molecular weight of at least 10,000.

The effectiveness of polymers according to the present invention as structural viscosity builders is exemplified by the following examples.

EXAMPLE 1

Solution Preparation

Polyvinylpyrrolidone (PVP, number average MW 360,000, obtained from Polysciences, Inc.) was made up as a 5 wt % concentrate in CaBr$_2$ brine (55% salt, 1.7 g/cc or 14.2 lbs/gal) by adding solid polymer particles at a rate of 0.1 g/min/100 g solution into the surface of the liquid vortex generated by a magnetic stirrer. Occasionally, additional shaking of the solution for 1-4 hours was required to complete the process. The solutions remained transparent over a period of a month, with no evidence of the "fish eyes" usually exhibited by aggregating high molecular weight polymer solutions. Dilutions to lower concentrations were made up as necessary.

EXAMPLE 2

Thermal Aging and Viscosity Measurement

In static aging tests about 3 ml of 1.5 wt % polymer solution were placed in an open pyrex cup and inserted into the interior of a T-type Swagelok filter, Model Nupro TF, made of 316 stainless steel and capable of withstanding 6,000 psi. The securely tightened assembly was then placed in an oven at a given temperature for 16 hours. Before and after placing the assembly in the oven, the cup and its contents and the total assembly were weighed so as to detect any leakage.

After cooling the assembly to room temperature, 1 ml of solution was removed, and its viscosity determined with a Brookfield LVD cone and plate viscometer maintained at 25° C., covering the general shear rate region between 2 and 50 sec$^{-1}$. Results were compared with initial values at 25° C. prior to aging. (Note: The ability of a fluid to suspend particles, which is essential to drilling fluid performance, is believed to be related to viscosity at 7 sec$^{-1}$.)

Dynamic aging tests, i.e. measuring shear stress at a constant shear rate at an elevated temperature and pressure, were performed using a Haake D40/300 high pressure, high temperature rotational viscometer.

Data on unheated polymer samples stored at room temperature are also presented in Table I; no significant change in viscosity at various shear rates was observed over a period of several weeks, as shown by Run Nos. 1-5.

TABLE I

| Viscosities, cp, at 25° C., of CaBr$_2$ Brine (14.2 lb/gal) and 1.5% Polyvinyl Pyrrolidone (MW 360,000) in Same Brine | | | | | | | |
|---|---|---|---|---|---|---|---|
| Shear Rate, sec$^{-1}$ | (cp) of CaBr$_2$ Brine | (cp) of 1.5% Polyvinyl Pyrrolidone in CaBr$_2$ Brine | | | | | |
| | | Run #1 | Run #2 | Run #3 | Run #4 | Run #5 | Ave. |
| 230 | 6.4 | | | | | | |
| 115 | 6.4 | | | | | | |
| 23.0 | 6.3 | 64.5 | 64.0 | 66.5 | 69.0 | 65.5 | 65.9 |
| 11.5 | | 66.0 | 65.0 | 67.0 | 70.0 | 73.0 | 68.2 |
| 5.75 | | 68.0 | 66.0 | 68.0 | 72.0 | 70.0 | 68.8 |
| 2.30 | | 70.0 | 70.0 | 65.0 | 75.0 | 75.0 | 71.0 |

Viscosities at 25° C. of 1.5% wt PVP in CaBr$_2$ brine following static heating for 16 hours at temperatures up to 250° C. (480° F.) are summarized in Table II. The viscosities of these solutions remained constant (~70 cp, depending on S) up to heating temperatures of 220° C. (428° F.), with less than 10% deviation. The viscosity dropped markedly after heating at 250° C. (10-30 cp depending on S) indicating thermal decomposition of the PVP polymer.

TABLE II

| Viscosities, cp, at 25° C. of 1.5% Polyvinyl Pyrrolidone (PVP) in CaBr$_2$ Brine* After Static Aging for 16 hrs. at Various Temperatures | | | | | |
|---|---|---|---|---|---|
| Shear Rate, sec$^{-1}$ | Ave. (cp) of 1.5% PVP in CaBr$_2$ Brine Unheated | 1.5% PVP | | | |
| | | 155° C. (310° F.) | 190° C. (375° F.) | 220° C. (428° F.) | 250° C. (482° F.) |
| 23.0 | 65.9 | 60.0 | 65.0 | 63.0 | 13.0 |
| 11.5 | 68.2 | 65.0 | 69.0 | 63.0 | 20.0 |
| 5.75 | 68.0 | 70.0 | 76.0 | 70.0 | 26.0 |
| 2.30 | 71.0 | 70.0 | 85.0 | 75.0 | — |

*Density 14.2 lb/gal

By way of comparison, the viscosity of 0.38 weight percent (2 lbs/barrel) of hydroxyethyl cellulose (Dowell J164) in CaBr$_2$/CaCl$_2$ brine (13 lbs/gal), a current commercial completion fluid system, dropped by at least 80% at 23 sec$^{-1}$ after heating for 16 hours at 155° C. (310° F.).

CaBr$_2$ brine (1.7 g/cc) is a Newtonian liquid at 25° C., and its viscosity is 6.4 cp (Table I). On the other hand, a 1.5% by weight PVP solution in this brine is a pseudoplastic fluid obeying the relationship $$\tau = K(\dot{S})^{0.9},$$

where $\tau$ is shear stress in dynes/cm$^2$, and $\dot{S}$ the shear rate in sec$^{-1}$. Its viscosity at ~5 sec$^{-1}$ is ~70 cp.

Tests were also conducted with respect to a 5 wt % PVP solution. More particularly, after several hours of testing as a function of shear rate, at various temperatures and pressures, a 5 wt % PVP in 14.2 lbs/gal. brine was brought to 220° C. (390° F.) and 470 psi N$_2$ pressure and subjected to a shear rate of 1200 sec$^{-1}$. Over the six hour testing at these conditions the solution viscosity (~100 cp) remained constant, indicating no polymer degradation.

Further test results are summarized in Table III.

TABLE III

| System | Initial Viscosity at 46 sec$^{-1}$, 25° C. | Viscosity after 16 hrs. heating, at 25° C. and 46 sec$^{-1}$ | Viscosity under shear at 1700 sec$^{-1}$ 470 psi and 200° C.[c] |
|---|---|---|---|
| Polyvinyl pyrrolidone[a] | 66 cp | 50 cp after heating at 220° C. | 100 cp - constant viscosity for 6 hrs. |
| Hydroxyethyl cellulose[b] | 50 cp | 20 cp after heating at 155° C. | — |

[a] 1.5%, M.W. 360,000, in 14.2 lbs/gal CaBr$_2$ brine
[b] Dowell J-164, in CaCl$_2$/CaBr$_2$ brine of 13 lbs/gal, at a level of 2 lbs/barrel
[c] Using 5% polyvinyl pyrrolidone as in[a]

The thermal stability of PVP as shown by the above data is believed to be associated with its interactions with the selected CaBr$_2$ salt. As evidence for this, it is noted that a 1.5% PVP solution in pure water (6 cp at 25° C.) loses ~70% of its initial viscosity after heating at 155° C. for 16 hours. It is hypothesized that the extra thermal stability of PVP in CaBr$_2$ brines may be due to Ca++ bridges between the neighboring carboxy groups upon hydrolysis of the pendant pyrrolidone groups, as shown as follows.

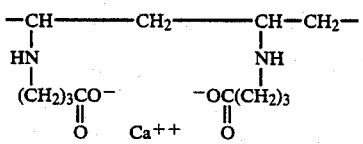

Even without hydrolysis, the possibility exists that the stabilization may be due to the complexing of the cation with the carbonyl group of the pendant pyrrolidone units. [Note: A. F. Diorio et al, Nature 195, 1276 (1962)].

This phenomenon is shown as follows.

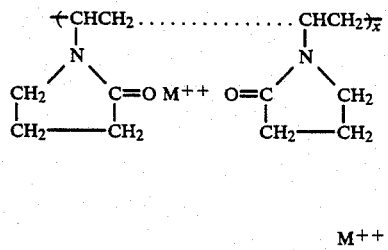

M++ = metal cation

It is also likely that the same intramolecular interactions in concentrated brines lead to intermolecular associations, which would account for the observed viscosity retention of the PVP/CaBr$_2$ system.

The solubility of PVP in aqueous brines is also influenced by the type of salt employed. Results from experiments using a variety of salts (which, for diagnostic purposes, were not necessarily typical of those used in completion fluids) show that PVP has limited solubility in a conventional 13 lbs/gal. CaCl$_2$/CaBr$_2$ mixed brine, but is soluble in 50 wt % solutions of NaBr, KI, or NiCl$_2$.

In terms of the thermal and/or oxidative stability of the viscosifier, the presence of a given cation(s) in the brine is also significant. For example, in preliminary experiments with 1.5% PVP in 66% NiCl$_2$, this salt does not appear to give the high temperature stability performance of the CaBr$_2$ system. An 18% drop in viscosity was noted at 23 sec$^{-1}$ even after mild heating at 130° C. for 5 hours.

Polyvinyl pyrrolidone (PVP) apparently has thermal stability arising from the olefinic backbone structure and the cyclic pendant groups. Also, PVP is available in commercial quantities in a wide range of molecular weights (10,000 to above 10$^6$), and its copolymers and related derivatives can be either purchased or readily synthesized.

The selection of CaBr$_2$ for the concentrated brine of the foregoing Examples was guided by the early literature on "salting-in effects" by H. Morawetz, "Macromolecules in Solution", J. Wiley Publishers, 1975 Edition, p. 85, and the more current theoretical developments on hydrophobic liquid chromatography and "repulsive" Van der Waal's interactions by R. Srinivasan and E. Ruckenstein, Sep. and Purif. Methods 9, 267 (1980). The solvent (salting-in) power of concentrated brines, as discussed by G. W. Stanton in U.S. Pat. No. 2,648,647, is strongly dependent on the choice of both cation and anion, and increases with the polarizability of the anion. This solvent power is depicted in the form of a series, shown in Table IV.

TABLE IV

| | | |
|---|---|---|
| K+, Fe+3, Pb+2 | | ↑ |
| ↓ NH$_4$+, Cd+2, Al+3 | SCN− | ↑ |
| ↓ Na+, Ba+2 | I− | ↑ |
| ↓ Ca+2, Li+, Mg+2 | Br− | Effectiveness |
| ↓ Ga+3, Sb+3, In+3, Tl+3, Sn+4 | Cl− | |
| Zn+2, Ag+, Ni+2, Co+2, Mn+2 | NO$_3$− | |
| | SO$_4$−2 | |

Although this series has been designed especially for polyacrylonitrile, it is expected to hold for other polymers and low MW organic derivatives with some variations. It should be noted also that several salts currently used in clear brine drilling fluids are listed in this series.

Particularly in view of the above discussion, it is apparent that one of ordinary skill in the art can readily select suitable polyvinylpyrrolidone solubilizing salts within the scope of the present invention. It is noted that it is a matter of routine experimentation to determine the solubility of polyvinylpyrrolidone in various brines as well as to measure the viscosity of these polyvinylpyrrolidone containing brines.

High density, aqueous brine completion, workover, and packer fluids have become recognized in the last few years for their effectiveness in minimizing formation damage and providing wellbore stability, as well as in establishing and maintaining high productivity of oil and gas wells, G. Poole, Oil and Gas. J., July 13, 1981, p. 151; D. Acosta, Ibid., Mar. 2, 1981, p. 83; R. J. Spies et al., SPE 9425, September 1980.

Specifically, high density brine fluids are solutions containing 10 to 60 weight percent of salts such as NaCl, CaCl$_2$, CaBr$_2$, ZnBr$_2$ and their mixtures, having densities up to ~2.4 g/cc (~20 lbs/gal). Their high salt content prevents swelling and dispersion of formation clays and shales by favorable ion exchange and osmotic pressure reduction. Their high densities provide sufficient hydrostatic head to balance formation pressures and thus prevent the influx of undesirable fluids into wells during drilling. Since they are free of dispersed solids, the high density fluids are particularly noted for their prevention of formation plugging, high hydrocarbon recovery, and efficient bottomhole cleaning.

With current accelerated efforts to discover new oil and gas deposits by deep drilling (say, below 10,000 feet) (Note B. Tippee, Oil and Gas J., Aug. 10, 1981, p. 33), it has become recognized that future developments in drilling fluid technology must make use of viscosifiers, fluid loss control agents, and other additives that are capable of satisfactory performance at high temperatures (>135° C., >275° F.) and high pressures (>5,000 psi). The use of polyvinylpyrrolidone may lead to particularly useful high temperature stable, high density brine drilling fluids.

The embodiments of the Examples herein provide information and directions for other clear brines, polymers, and additives for high density, multifunctional fluids for deep well drilling. Here are some examples: increasing M.W. to reduce the polymer content and hence cost; utilizing pyrrolidone and related monomers in "engineered" non-ionic and ionic polymers and copolymers, including block, star, graft, and ionene varieties; extending the pyrrolidone system to include highly temperature stable amides, e.g., nylons, Kevlar, Nomex; selecting other high density brines and brine mixtures, e.g., brines containing LiCl, $CaI_2$, $Ca(SCN)_2$, etc., with and without admixture of suitable solubilizing surfactants; selecting polar and hydrocarbon-derived solvents instead of water [note applicant's copending U.S. application Ser. No. 413,575, now U.S. Pat. No. 4,498,994; in situ polymerization of monomers in wells and in gas and oil formations containing highly concentrated brines, etc.

The viscosity increasing amount of polymer used in accordance with aspects of the present invention is that amount which is sufficient to achieve the desired viscosifying functions. In drilling fluids these functions involve transportation of cuttings to the surface and suspension of solids when the drilling fluid is not being circulated. The use by a viscosity increasing amount of polymer may result in an increase in viscosity at room temperature of a factor of, e.g., at least 4. In other terms, the amount of polyvinylpyrrolidone polymer employed may be, e.g., about 0.5–10% by weight or as exemplified in the foregoing Examples from about 1.5 to about 5% by weight of the fluid.

The salinity of the aqueous brine drilling fluid in accordance with aspects of the invention may be from at least 30% by weight up to the salt saturation point of the fluid, which is generally about 60–65% by weight. The brine fluids of the present invention may have a density of, e.g., from about 12 to about 16 pounds per gallon.

Although the viscosifying effect of polyvinylpyrrolidone in accordance with aspects of the present invention is preferably useful in completion fluids for drilling in the vicinity of oil or gas producing formations, this effect may also be used when drilling in areas other than in the vicinity of oil or gas formations. Thus, polyvinylpyrrolidone viscosified drilling fluids may contain constituents other than water, brine and surfactants, such as filter loss control solids in an amount sufficient to prevent loss of fluid to the formation.

Polyvinylpyrrolidone viscosified aqueous brine drilling fluids, particularly completion fluids, are felt to be useful when drilling in formations having a temperature of at least 300° F. (e.g., 300°–450° F.). Such temperatures may occur at drilling depths of at least 15,000 feet (e.g., 15,000–30,000 feet).

The drilling fluids of the present invention preferably do not contain other polymeric thickeners such as starch, carboxymethyl cellulose, and modified polyacrylates or mixing agents such as crude oil and diesel oil.

Although polyvinylpyrrolidone/brine fluids have been described herein primarily with respect to their use as drilling fluids, it will be understood that these fluids may also be quite useful in other fields. More particularly, these fluids should be applicable to a wide range of industrial applications, such as for example in processing minerals from salty solutions, in the production of specialty coatings, polymers, fibers, and membranes, in the formulation of "synthetic" water-based pneumatic fluids and novel lubricants, and last, but not least, in light energy conversion based on heat transport between concentrated and less concentrated brine layers in ponds.

The present invention may comprise, consist essentially of or consist of the materials or method steps described herein.

What is claimed is:

1. An aqueous brine fluid comprising:
   (i) one or more vinylpyrrolidone homopolymers present in a concentration of about 1.5% by weight of said fluid; and
   (ii) at least about 30% by weight of said fluid being a salt of calcium bromide.

2. The fluid according to claim 1, wherein the remainder of said fluid is essentially water.

3. The fluid of claim 1, wherein the calcium bromide is present in an amount from about 50% by weight of said fluid up to the calcium bromide saturation point of said fluid.

4. A fluid according to claim 1 having a number average MW of approximately 360,000.

5. A fluid according to claim 1 having a density of from about 12 to about 16 pounds per gallon.

6. A fluid according to claim 1, wherein said polyvinylpyrrolidone polymer is a polymer of the formula

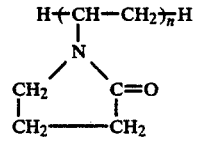

where n is at least about 90.

7. A drilling fluid which is a completion fluid for use in drilling a bore hole with a drill bit, wherein said drill bit is in the vicinity of an oil or gas producing formation, said completion fluid consisting essentially of
   (i) water;
   (ii) calcium bromide in an amount of at least about 30% by weight of said fluid; and
   (iii) polyvinylpyrrolidone homopolymer having a number average MW of approximately 360,000 and present in a concentration from about 1.5% to about 10% by weight of said fluid.

8. A drilling completion fluid according to claim 7 having a density of from about 12 to about 16 pounds per gallon.

9. A drilling completion fluid according to claim 7 having a calcium bromide concentration from about 50% by weight of said fluid up to the calcium bromide saturation point of the fluid.

10. A drilling completion fluid according to claim 7 which does not contain oil mixing agents.

11. A drilling fluid for use in drilling a bore hole with a drill bit, wherein said drill bit is in the vicinity of an oil or gas producing formation, at elevated temperatures on the order of above 300° F., said drilling fluid comprising:
 (i) water;
 (ii) calcium bromide in an amount of at least about 30% by weight of said fluid;
 (iii) a filter loss control solid selected from the group consisting of clays and homopolymers in an amount sufficient to prevent loss of fluid to said formation; and
 (iv) polyvinylpyrrolidone having a number average MW of approximately 360,000 and present in a concentration from about 1.5% to about 10% by weight of said fluid.

12. A method for transporting cuttings away from a drill bit, operating in an environment of elevated temperatures on the order of above 300° F., to the surface of a bore hole, said method comprising entraining and suspending said cuttings in a drilling fluid which flows from said drill bit up said bore hole to said surface, wherein said drilling fluid comprises:
 (i) water;
 (ii) calcium bromide in an amount of at least about 30% by weight of said fluid; and
 (iii) polyvinylpyrrolidone polymer having a number average MW of approximately 360,000 and present in a concentration from about 1.5% to about 10% by weight of said fluid.

13. A method according to claim 12, wherein said fluid has a calcium bromide concentration of from about 50% by weight up to the calcium bromide saturation point of the fluid.

14. A method according to claim 12, wherein said drilling fluid has a density of from about 12 to about 16 pounds per gallon.

15. A method according to claim 12, wherein said fluid does not contain oil mixing agents.

* * * * *